United States Patent
Arendsen et al.

(10) Patent No.: US 6,719,352 B2
(45) Date of Patent: Apr. 13, 2004

(54) VISOR MOUNTING ASSEMBLY

(75) Inventors: Randy L. Arendsen, Holland, MI (US); Michael D. Verkaik, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 34 days.

(21) Appl. No.: 10/218,397

(22) Filed: Aug. 14, 2002

(65) Prior Publication Data

US 2004/0032144 A1 Feb. 19, 2004

(51) Int. Cl.[7] .................................................. B60J 3/02
(52) U.S. Cl. ..................................... 296/97.9; 296/97.13
(58) Field of Search ..................... 296/97.1, 97.4–97.13; 280/730.2

(56) References Cited

U.S. PATENT DOCUMENTS

| | | | |
|---|---|---|---|
| 4,500,131 A | 2/1985 | Fleming | |
| 4,569,552 A | 2/1986 | Marks | |
| 4,729,590 A | 3/1988 | Adams | |
| 4,762,359 A | 8/1988 | Boerema et al. | |
| 5,031,954 A | * 7/1991 | Peterson et al. | 296/97.9 |
| 5,230,546 A | 7/1993 | Smith et al. | |
| 5,499,854 A | * 3/1996 | Crotty, III et al. | 296/97.13 |
| 5,544,927 A | * 8/1996 | Snyder et al. | 296/97.9 |
| 5,580,117 A | * 12/1996 | Goclowski | 296/97.6 |
| 5,685,629 A | 11/1997 | Hemmeke et al. | |
| 5,765,896 A | * 6/1998 | Grisval | 296/97.9 |
| 5,765,897 A | 6/1998 | Snyder et al. | |
| 5,820,197 A | 10/1998 | Lanser | |
| 5,857,728 A | 1/1999 | Crotty, III | |
| 6,003,928 A | 12/1999 | Curtindale | |
| 6,068,323 A | 5/2000 | Brown et al. | |
| 6,250,708 B1 | 6/2001 | Kurachi | |
| 6,309,004 B1 | * 10/2001 | McNutt et al. | 296/97.6 |
| 6,334,626 B2 | * 1/2002 | Nakajima et al. | 296/97.1 |
| 2002/0180234 A1 | * 12/2002 | Aoki et al. | 296/97.9 |

\* cited by examiner

Primary Examiner—Stephen T. Gordon
Assistant Examiner—Greg Blankenship
(74) Attorney, Agent, or Firm—Price, Heneveld, Cooper, DeWitt & Litton

(57) ABSTRACT

A visor mounting assembly includes a detent spring extending over an end of a visor rod projecting through a mounting bracket and engaging a detent on an end of the visor rod to detent the visor when moved from a front windshield position to a side window position at a location allowing clearance of a side curtain air bag. A detent spring includes a pair of orthogonally integrally joined U-shaped members defining vertically spaced horizontally extending floors, each having apertures aligned for receiving a visor rod end and vertically extending walls coupled to the horizontally extending floors for engaging the sides of a visor rod extending through apertures. One assembly includes a visor rod with a keyed end for lockably receiving a stop member which cooperates with a visor mounting bracket when the visor is moved from a front windshield position to a side window position, limiting its movement.

20 Claims, 4 Drawing Sheets

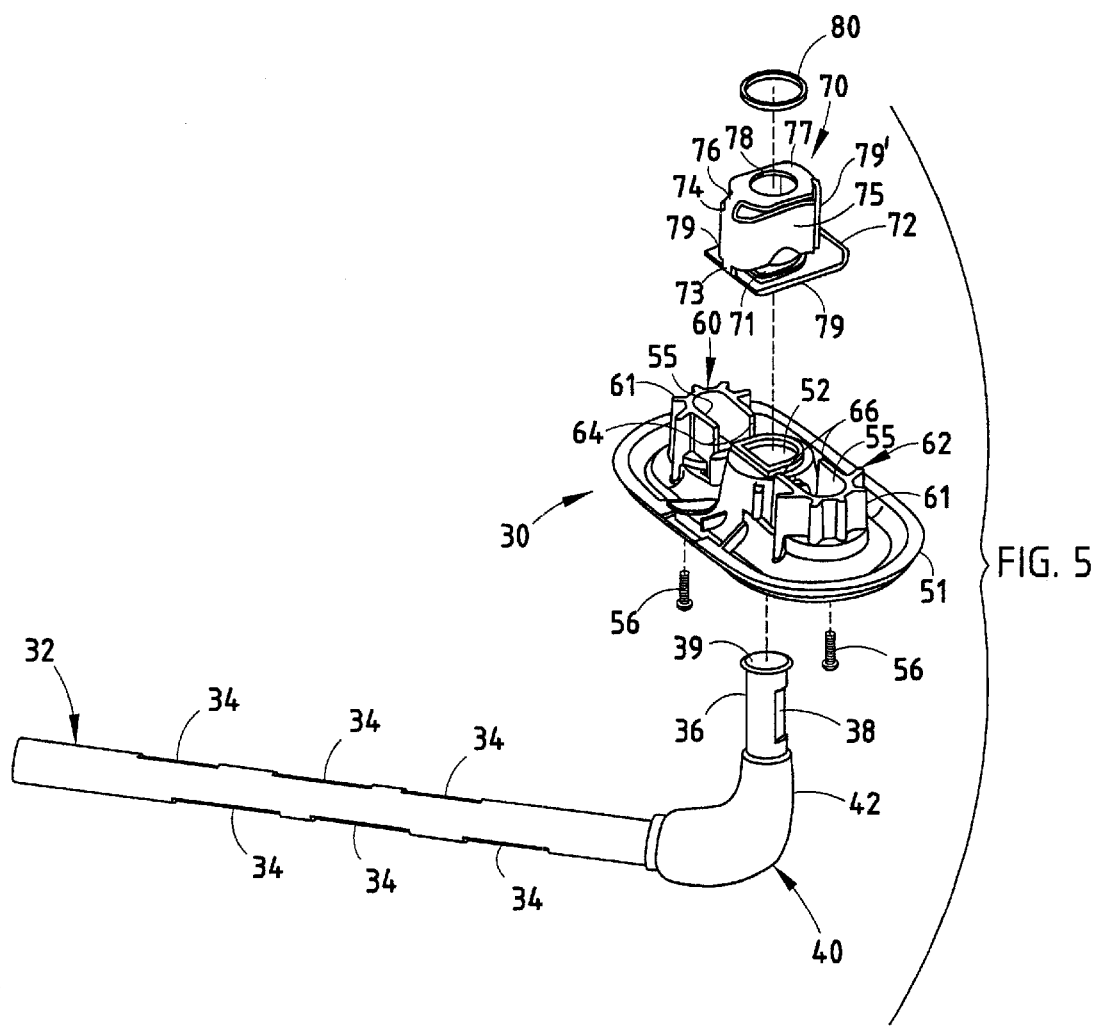
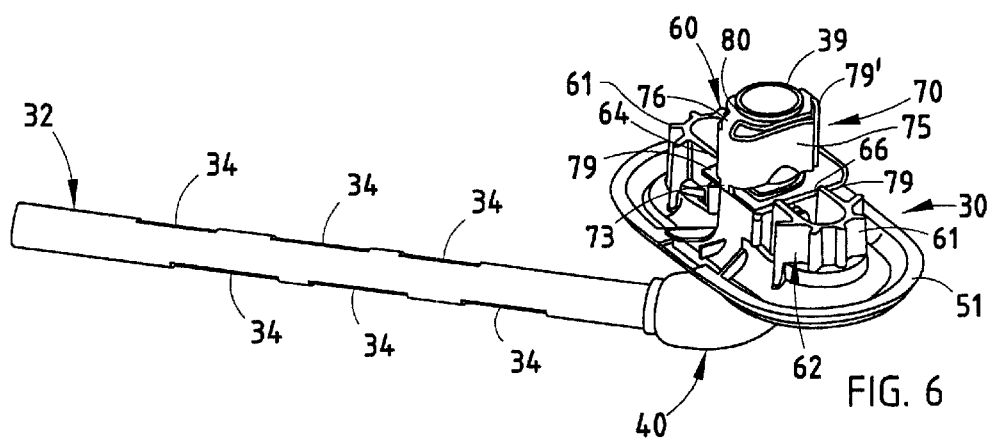

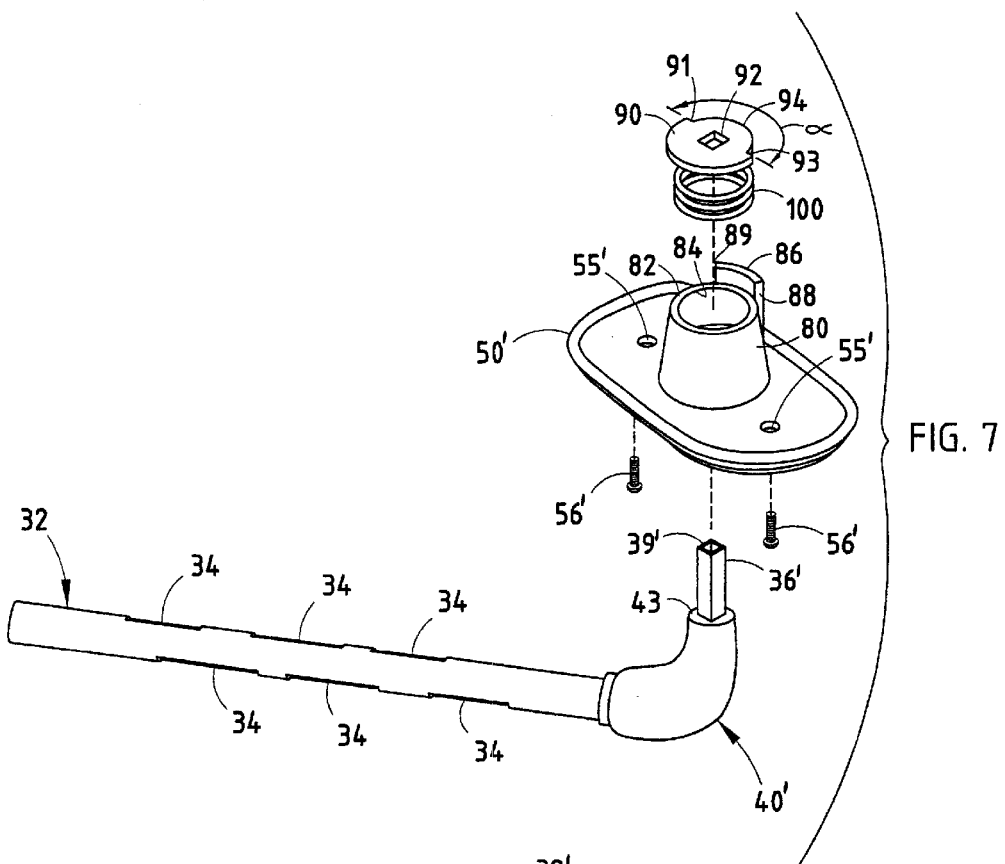
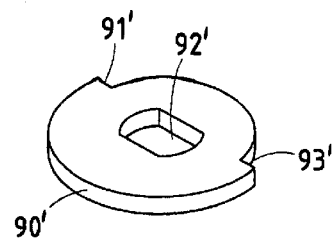

VISOR MOUNTING ASSEMBLY

BACKGROUND OF THE INVENTION

The present invention relates to vehicle visors and particularly to a mounting assembly for attaching a visor to a vehicle.

Visors typically are conventionally mounted to a vehicle by an elbow mounting bracket which couples one end of the visor pivot rod to the vehicle. Such elbow brackets are secured to the sheet metal or other framework of the vehicle roof by fastening screws, snap-in fasteners, or, in some instances, twist on bayonet-type fasteners. Visors include a visor body into which the other end of the visor pivot rod extends with a torque fitting extending between the visor body and rod to allow the visor to rotate on the pivot rod from a stored position adjacent the vehicle headliner to various adjusted lowered use positions. The elbow bracket allows the visor to be pivoted to a side window position for blocking incoming sunlight from the side of the vehicle. Frequently such visors include illuminated vanity mirrors and/or accessories, such as garage door opening transmitters, memo recorders, or other electrical accessories.

Side curtain air bags are mounted within the vehicle headliner adjacent and above the side windows of the vehicle and extend downwardly when actuated. With such conventional visor mounting assemblies, it is possible for a vehicle operator to adjust a visor to a side window sunscreening position which could interfere with or inhibit the operation of a side curtain air bag. U.S. patent application Ser. No. 09/754,494, entitled VISOR MOUNTING ASSEMBLY filed on Jan. 4, 2001, provides one solution to the problem by providing detent and/or stops at the interface between the visor rod elbow and its elbow mounting bracket.

SUMMARY OF THE INVENTION

This invention addresses the problem of misaligning a visor in a side window sun-blocking position which could interfere with the operation of a side curtain air bag by structure which is not located at the interface between the visor rod elbow and its elbow mounting bracket.

The visor mounting assembly of the present invention provides a system in which a visor rod is mounted to a visor rod mounting bracket with a detent spring mounted to the mounting bracket and engaging a detent on an end of the visor rod projecting through the mounting bracket on a side opposite the finished surface of the vehicle headliner. The spring detents the visor when moved from a front windshield position to a side window position at a location which allows clearance of the side curtain air bag, thereby providing the user with a tactile detent allowing positioning of the visor when in a side window position at a location which does not interfere with or inhibit the operation of a side curtain air bag.

According to another aspect of the invention, a detent spring is provided which includes a pair of orthogonal integrally joined U-shaped members defining vertically spaced horizontally extending floors, each having apertures aligned for receiving a visor rod end and vertically extending walls coupled to the horizontally extending floors and between the floors for engaging the sides of a visor rod extending through the apertures.

In another embodiment of the present invention, the visor mounting assembly includes a visor rod with a keyed end for lockably receiving a stop member which cooperates with a visor mounting bracket such that when the visor is moved from a front windshield position to a side window position, its movement is limited to locate the visor in a position spaced to provide clearance in the zone of operation of a side curtain air bag if deployed. Accordingly, a visor mounting assembly of the present invention provides an improved visor mounting system by which the vehicle operator can either tactilely locate or is limited in locating a visor in a safe side window sun-blocking position for use in a vehicle equipped with a side curtain air bag.

These and other features, objects and advantages of the present invention will become apparent upon reading the following description thereof together with reference to the accompanying drawings.

BRIEF DESCRIPTION OF THE DRAWINGS

FIG. 5 is an enlarged exploded perspective view of one embodiment of the visor mounting assembly of the present invention;

FIG. 6 is a perspective view of the structure of FIG. 5 once assembled;

FIG. 7 is an exploded perspective view of an alternative embodiment of the invention;

FIG. 8 is an enlarged fragmentary vertical cross-sectional view of the assembled structure of FIG. 7; and FIG. 9 is a perspective view of an alternative element of the embodiment of the invention shown in FIGS. 7 and 8.

DETAILED DESCRIPTION OF THE PREFERRED EMBODIMENT

Figure 1:
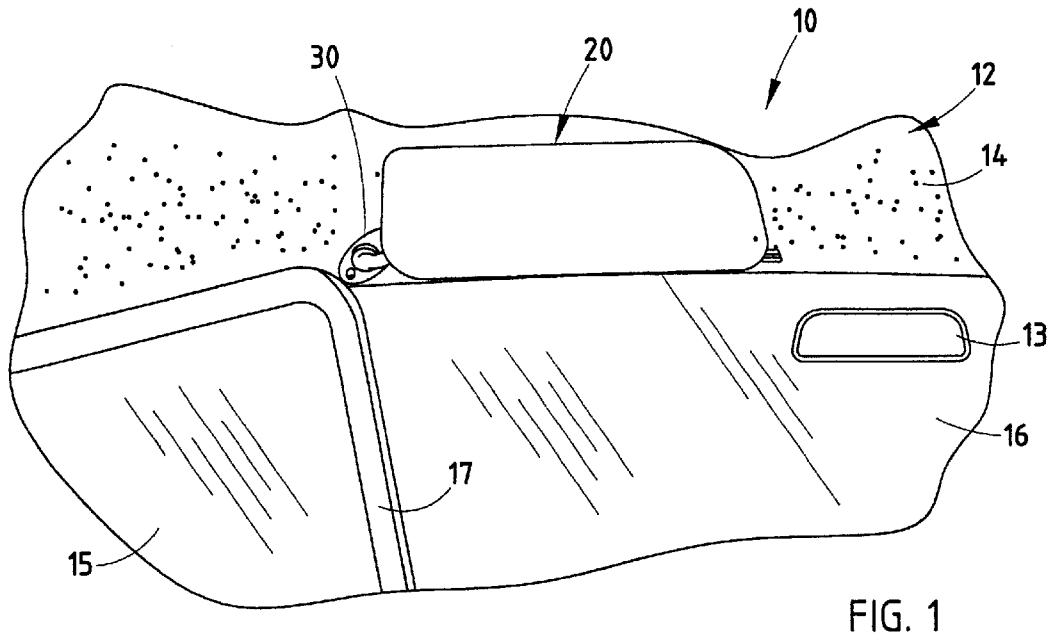
FIG. 1 is a fragmentary perspective view of a vehicle including a visor embodying the present invention, shown with the visor in a first position.
Figure 2:
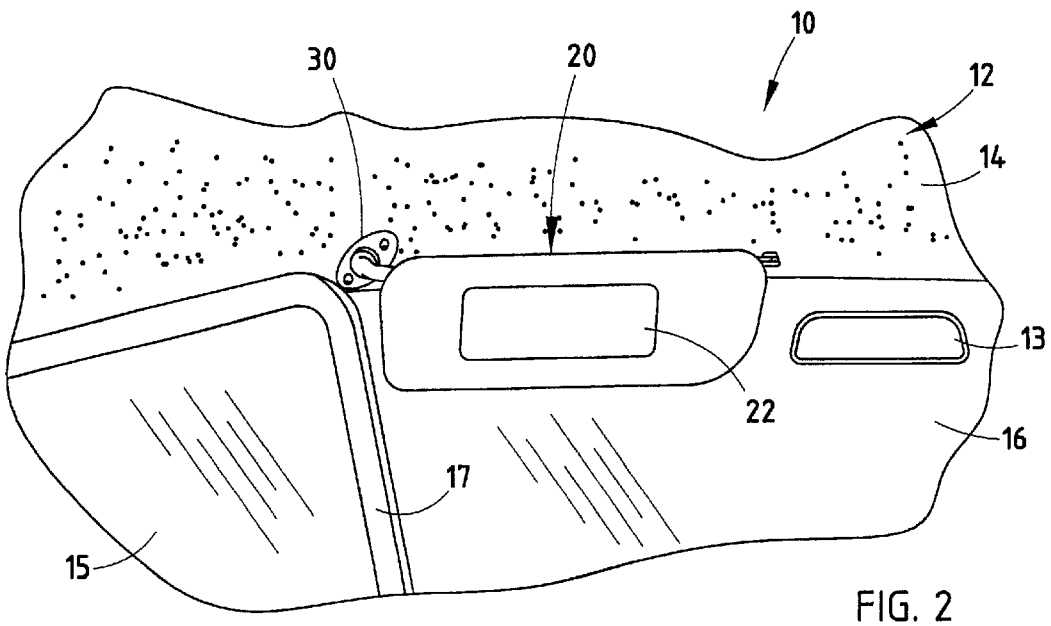
FIG. 2 is a fragmentary perspective view of a vehicle including a visor embodying the present invention, shown with the visor in a second lowered use position.
Figure 3:
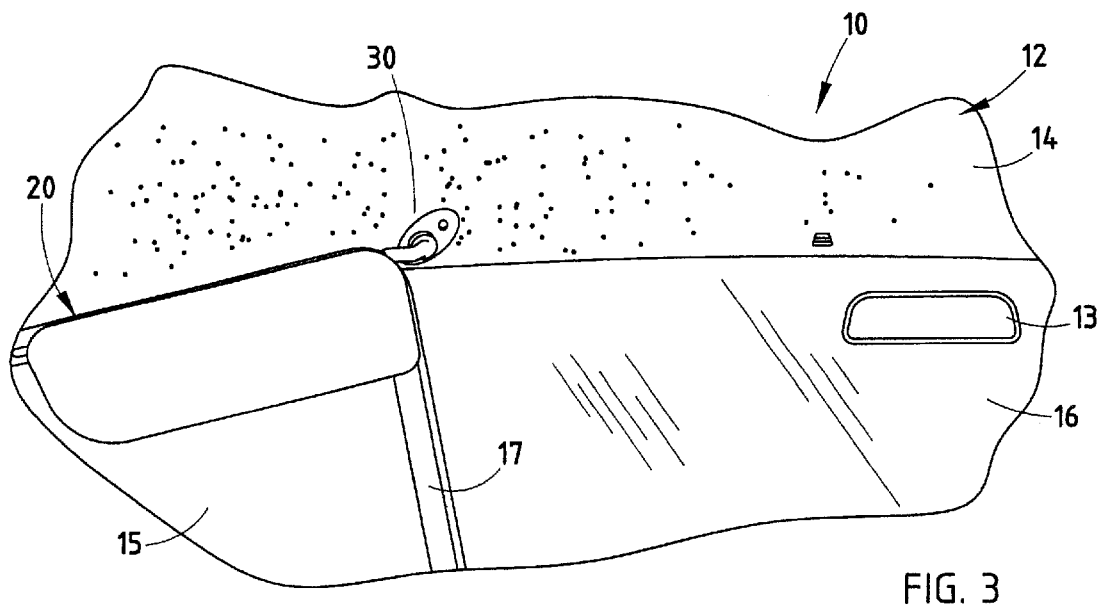
FIG. 3 is a fragmentary perspective view of a vehicle including a visor embodying the present invention, shown with the visor in a side window sun-blocking position.

Referring initially to FIGS. 1–3, there is shown a vehicle 10, such as an automobile, sport utility vehicle, van, truck or the like, which includes a roof 12 typically including a sheet metal support covered by a headliner 14 which can be integrally molded and attached to provide a sound absorptive and decorative interior finish to the vehicle. A visor 20 is mounted above the windshield 16 of the vehicle by means of a visor mounting assembly 30 described in greater detail below.

The visor 20 can be moved from a raised stored position adjacent the vehicle headliner 14, as shown in FIG. 1, to a lowered windshield sun-blocking position, as shown in FIG. 2, adjacent the rearview mirror 13, which is mounted to the windshield 16 or alternatively to the edge of the vehicle roof 12 adjacent windshield 16. The visor 20 may include a covered illuminated vanity mirror assembly 22 of the type disclosed in U.S. Pat. No. 5,685,629, which allows the vehicle operator to use the vanity mirror contained in the visor under low ambient light conditions. Visor 20 can be pivoted, using the visor mounting assembly 30, from a front windshield sun-blocking position, as shown in FIG. 2, around the A-pillar 17 of the vehicle to a side window sun-blocking position, as seen in FIG. 3.

Figure 4:
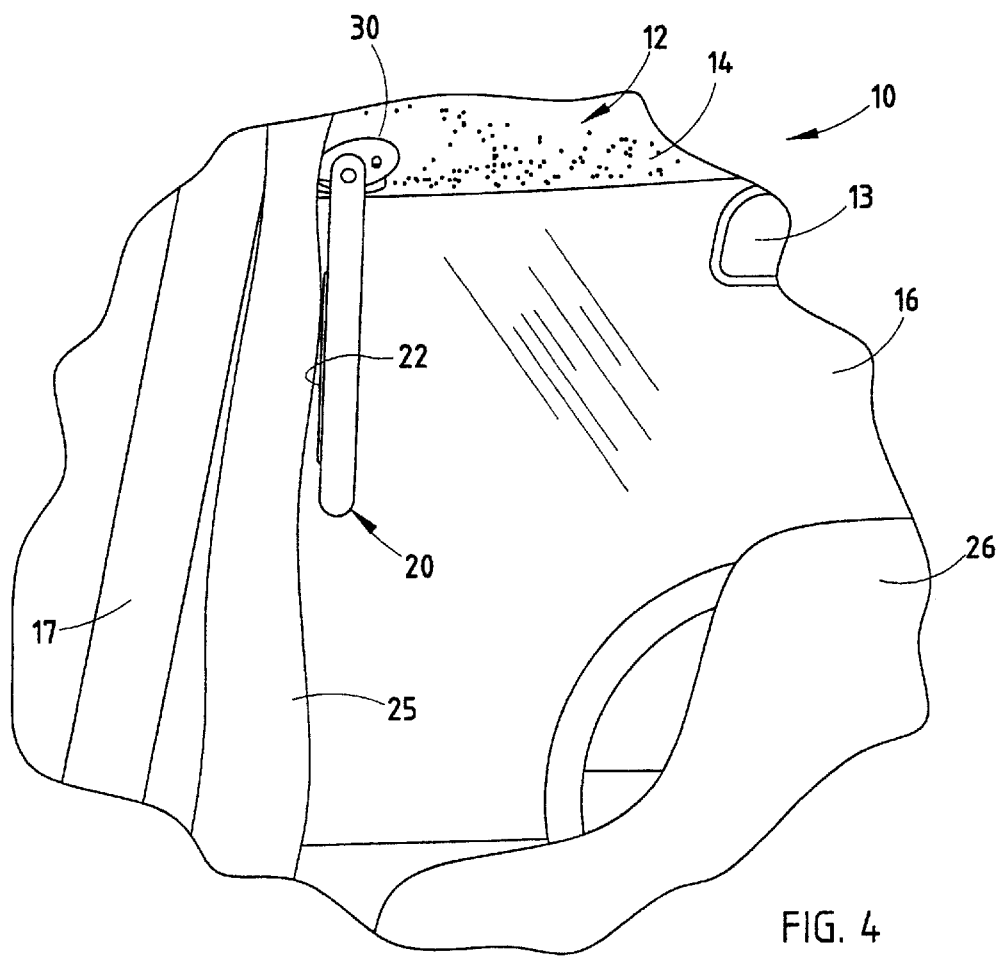
FIG. 4 is an enlarged end elevational view of the visor as shown in FIG. 3, shown with a side curtain air bag in a deployed position.

Many vehicles now include a side curtain air bag, which is mounted in the headliner 14 in the area above and adjacent side window 15. With such an installation, the possibility exists that a visor could be located in a position to block the deployment of the side curtain air bag or otherwise interfere with its proper operation. The visor mounting assembly 30 of the present invention prevents such a possibility and allows the side curtain air bag 25, illustrated in a deployed position in FIG. 4, to properly deploy downwardly in a position adjacent the driver seat 26. As seen in FIG. 4, the vertical zone below the headliner 14 and between the side window 15 and visor 20 is clear to allow deployment of the side curtain air bag. Although the driver's side is shown in FIGS. 1–4, it is to be understood that the visor assembly of the present invention can be used on either one or both of the driver and passenger sides of a vehicle. The details of the visor pivot rod and torque control internal to the visor body are not shown in detail but can be of a construction as disclosed in U.S. Pat. No. 4,569,552, which utilizes a torque control of the type also disclosed in U.S. Pat. No. 4,500,131. One embodiment of the visor mounting assembly 30 is now described in detail with reference to FIGS. 5 and 6.

The visor mounting assembly 30 (FIGS. 5 and 6) includes a visor rod 32 having alternately staggered and spaced flats 34 which cooperate with a torque control (not shown) within the visor body for allowing the visor to be held in a detented stored position, as shown in FIG. 1, and to rotate downwardly to a desired adjusted position. Assembly 30 includes a mounting bracket 50 and detent spring clip 70 which cooperate with the visor rod 32 to allow the visor 20 to be moved in a controlled manner to the side window position, as shown in FIGS. 3 and 4. The visor rod 32 is generally L-shaped including a tip end 36 (FIG. 5), which extends upwardly through central aperture 52 in mounting bracket 50 which, in turn, is secured to the vehicle roof 12 by a plurality of fastening screws 56 extending through apertures 55 on opposite sides of central aperture 52 in bracket 50. The visor rod 32 is surrounded at the junction of tip 36 and the elongated generally horizontally extending end of visor rod 32 by an elbow 40 made of a suitable polymeric material, such as polycarbonate or a thermoplastic resin, which is injection molded over rod 32. The elbow 40 includes a conically tapered upper end 42 which cooperates with the mating conically tapered aperture 52 in bracket 50 to provide lubricious smooth pivoting of the visor.

Bracket 50 is also integrally molded of a suitable polymeric material, such as polycarbonate, thermoplastic resin, or the like and includes a peripheral decorative flange 51 extending on the outer periphery thereof which engages the finished (inwardly facing side) of headliner 14 when bracket 50 and visor 20 mounted thereto is assembled to the vehicle. Bracket 50 includes on its upper side a pair of mounting bosses 60, 62 through which apertures 55 are formed. Bosses 60, 62 each include a plurality of spaced radially extending ribs 61, which extend from a pair of vertically extending mounting shoulders 64, 66, respectively, which define a socket for receiving and lockably holding in fixed relationship therein a detent spring clip 70. Clip 70 engages a cam surface comprising a flat 38 (FIG. 5) on visor rod end 36 for detenting the visor in a side window position as illustrated in FIGS. 3 and 4. Thus, visor rod end 36 extends through aperture 52 with the conical tapered section 42 of elbow 40 matingly fitting within aperture 52 in bracket 50, and end 36 extending above bracket 50 through spring clip 70. The visor rod is held in relationship thereto by a washer 80 over which the tip end 39 of visor rod 32 is roll formed, as seen in FIG. 6, upon assembly.

Detent spring clip 70 is integrally formed by stamping and bending of a suitable spring steel material treated for the automotive environment and includes a lower floor 72 with an aperture 71 formed therethrough for receiving visor rod end 36. Extending upwardly from the floor by bridging section 73 are U-shaped side walls defined by integral spring arms 74 and 75. Walls 74, 75 engage the end 36 of visor rod 32 including flat 38 which is angularly aligned for detenting the visor in the position shown in FIGS. 3 and 4 when moved to a side window position. Spring clip 70 also includes a bridging section 76 coupled to spring arms 74, 75 and an upper floor 77 vertically spaced from floor 72. Floor 77 also includes an aperture 78 for receiving visor rod end 36. Thus, spring clip 70 is supported on visor rod end 36 through aligned apertures 71 in floor 72 and aperture 78 in spaced upper floor 77 to vertically position the clip when washer 80 is placed over end 39 of the visor, which is conventionally roll-formed over to complete the assembly to provide both the spring detenting of the visor through the compression forces of spring arms or walls 74 and 75 as well as tension in a vertical direction by the spring force provided by resilient floors 72 and 77 due to the bridging sections 73, 76. The floors 72, 77 joined by bridging sections 73, 76 and U-shaped side walls 74, 75 are also generally U-shaped and aligned orthogonally to the U-shaped integral side walls. This clip construction performs the dual function of eliminating the necessity for a separate compression spring typically employed in visor mounting assemblies while at the same time providing the desired detent control of the visor when moved to a side window position, allowing deployment of a side window air curtain.

As seen in FIG. 6, the outer edges 79 of floor 72 engage shoulders 64 and 66 of mounting bosses 60, 62 to anchor the spring clip in fixed relationship with respect to bracket 50 while washer 80 and the rolled end 39 of rod 32 holds the spring clip 70 in fixed vertical relationship to visor rod end 36. Thus, spring clip 70 defines generally a pair of orthogonally related U-shaped vertical and horizontal members comprising floors 72 and 77 oriented in a horizontal, vertically spaced relationship and coupled by bridge sections 73 and 76 to side walls or spring arms 74 and 75, which are vertically oriented and horizontally spaced and which compressibly engage the rod end 36 and its detent 38. In a preferred embodiment of the invention, spring clip 70 also integrally includes a downwardly depending wall 79' which extends downwardly from the forward edge of upper floor 77 opposite bridge section 76 to surround and captively hold visor rod end 36 within the cylindrical opening defined by the apertures 71, 78 in floors 72 and 77 and walls 74, 75, and 79'.

In an alternative embodiment of the invention shown in FIGS. 7 and 8, the detent spring clip 70 is replaced with a stop member 90 comprising, as best seen, a generally flat washer-like member which is generally circular and disk-shaped with a keyed central aperture 92 shaped to conform to a keyed end 36' of an alternative embodiment of the visor rod 32 which can be otherwise of substantially the same construction as that shown in the first embodiment. Visor rod end 36' in the embodiment shown in FIGS. 7 and 8 is substantially square in cross section, as is aperture 92 which allows stop member 90 to extend over visor rod end 36' and rest upon annular surface 43 of rod elbow 40', which is integrally molded and is of substantially similar construction to member 40 shown in the first embodiment. Stop member 90 will, due to being keyed to pivot rod 32, rotate as the visor 20 is moved from the front windshield toward the side window.

The mounting bracket 50' of the alternative embodiment includes a conically raised end 80 into which elbow 40' extends with rod end 36' extending above the upper edge 82 of the conical opening 84 which matingly receives the similarly conically tapered end of elbow 40'. End 80 includes a stop shoulder 86 having ends 88 and 89. Shoulder 86 extends within an arcuate peripheral recess 94 of stop member 90 keyed to end 36' of visor rod 32, as best seen in FIG. 8, such that shoulder 86 will be selectively engaged by the end walls 91 and 93 of stop member 90 as the visor is rotated to limit the motion of visor 20, preventing its movement into a zone which would prevent deployment of air bag 25 as seen in FIG. 4. In this embodiment, a compression spring 100 extends above stop member 90 to hold the stop member in position against the annular shoulder 82 of mounting bracket end 80 and the top 39' of the pivot rod end 36' is rolled or peened over, as shown in FIG. 8, to hold spring 100 in compression and hold the assembly together. The mounting bracket 50' is secured to the vehicle roof by conventional mounting screws, such as screws 56', extending through apertures 55 in the mounting bracket. The annular recess 94 of stop member 90 circumscribes and arc α of approximately 120°, although a typical range will run from about 110° to 140° depending on a given vehicle. The arcuate length of stop shoulder 86 is approximately 30° and can be varied, in which case the arcuate length of recess 94 is correspondingly varied to allow the desired range of motion of the visor 20 between the front windshield position and a limited side window position, allowing deployment of the side air curtain 25.

Other keyed mounting arrangements of a stop member, such as stop washer 90, can be employed as illustrated in FIG. 9. In FIG. 9, a stop member 90' is provided with a generally rectangular opening 92' which receives a visor rod end having a similarly configured, generally rectangular cross section. Thus, in the embodiment shown in FIGS. 7–9, a positive stop member extends from the visor rod end and cooperates with arcuately spaced shoulders on the mounting bracket, thereby limiting the movement of the visor from a front windshield to a side window position. In each of the embodiments disclosed here in, the vehicle operator is either provided with tactile feedback for limiting movement of the visor where spring 70 in the first embodiment provides sufficient compression against the visor rod end flat 38 to essentially prevent over-swinging of the visor to the side window position or, in the case of the alternate embodiment shown in FIGS. 7-9, excess side window visor movement is prohibited.

It will become apparent to those skilled in the art that various modifications to the preferred embodiment of the invention as described herein can be made without departing from the spirit or scope of the invention as defined by the appended claims.

The invention claimed is:

1. A visor rod mounting system for securing a visor rod to a mounting bracket of a vehicle for attaching a visor to a vehicle roof comprising:

a visor rod having an end for extending into a visor mounting bracket, said end including a cam surface;

a visor mounting bracket for receiving said end of said visor rod; and a detent spring extending over said end of said visor rod and including a spring member engaging said visor rod cam surface end for detenting said visor rod at a side window position which permits deployment of a side window air curtain.

2. The system as defined in claim 1 wherein said cam surface comprises a flat formed on said end of said visor rod.

3. The system as defined in claim 1 wherein said mounting bracket includes a socket for holding said detent spring.

4. The system as defined in claim 3 wherein said socket is defined by a pair of spaced mounting bosses having spaced-apart opposed facing shoulders which engage said detent spring.

5. The system as defined in claim 3 wherein said detent spring comprises a pair of orthogonally, integrally joined U-shaped members defining vertically spaced horizontally extending floors, each having apertures aligned for receiving said visor rod end and wherein said spring member is defined by vertically extending walls coupled to said horizontally extending floors for engaging the end of said visor rod.

6. The system as defined in claim 1 wherein said detent spring comprises a pair of orthogonally, integrally joined U-shaped members defining vertically spaced horizontally extending floors, each having apertures aligned for receiving a visor rod end and wherein said spring member is defined by vertically extending walls coupled to said horizontally extending floors for engaging the end of said visor rod.

7. A visor rod mounting detent spring comprising:

a pair of orthogonally, integrally formed U-shaped spring steel members defining vertically spaced horizontally extending floors, each having apertures formed therein aligned for receiving a visor rod end and vertically extending walls coupled to said horizontally extending floors for engaging the end of a visor rod extending through said apertures.

8. The detent spring as defined in claim 7 wherein said floors are coupled to said walls by bridging sections.

9. The detent spring as defined in claim 8 wherein said floors provide a biasing force for holding a visor rod in a visor mounting bracket.

10. The detent spring as defined in claim 9 wherein said walls define spring arms for compressibly engaging an end of a pivot rod extending in a visor mounting bracket.

11. A visor rod mounting detent spring comprising:

a pair of orthogonally, integrally joined U-shaped members defining vertically spaced horizontally extending floors, each having apertures formed therein aligned for receiving a visor rod end and vertically extending walls coupled to said horizontally extending walls for engaging the end of a visor rod extending through said apertures, wherein said floors are coupled to said walls by bridging sections and said floors provide a biasing force for holding a visor rod in a visor mounting bracket, and wherein said walls define spring arms for compressibly engaging an end of a pivot rod extending in a visor mounting bracket, and further including an additional wall integrally extending from one of said floors to enclose the end of a pivot rod.

12. A visor rod mounting system comprising:

a visor rod having an end with a cross section allowing keying of said rod end to a stop member;

a stop member having an aperture shaped to lockably position said stop member on said end of said visor rod, said stop member including at least one shoulder for cooperating with a mounting bracket; and a visor mounting bracket for receiving said visor rod and stop member, said bracket including a shoulder which engages said shoulder of said stop member for limiting the motion of the visor to a side window position, which permits deployment of a side window air curtain.

13. The system as defined in claim 12 wherein said stop member is generally washer-shaped.

14. The system as defined in claim 13 wherein said stop member includes a peripheral recess.

15. The system as defined in claim 14 wherein said peripheral recess circumscribes an arc of from about 110° to about 140°.

16. The system as defined in claim 15 wherein said recess defines stop shoulders at opposite ends.

17. The system as defined in claim 16 wherein said shoulder of said mounting bracket is arcuate.

18. The system as defined in claim 17 wherein said shoulder of said mounting bracket circumscribes an arc of about 30°.

19. The system as defined in claim 18 wherein said end of said visor rod is square and said aperture in said stop member is square.

20. The system as defined in claim 18 wherein said end of said visor rod is rectangular and said aperture in said stop member is rectangular.

\* \* \* \* \*